United States Patent
Podkolzin et al.

(10) Patent No.: US 9,177,251 B2
(45) Date of Patent: Nov. 3, 2015

(54) IMPULSE REGULAR EXPRESSION MATCHING

(71) Applicant: Intel Corporation, Santa Clara, CA (US)

(72) Inventors: Alexander Podkolzin, Moscow (RU); Lav Ivanovic, Sunnyvale, CA (US); Anatoli Bolotov, Milpitas, CA (US); Mikhail Grinchuk, San Jose, CA (US); Sergey Afonin, Moscow (RU)

(73) Assignee: Intel Corporation, Santa Clara, CA (US)

( * ) Notice: Subject to any disclaimer, the term of this patent is extended or adjusted under 35 U.S.C. 154(b) by 44 days.

(21) Appl. No.: 14/156,648

(22) Filed: Jan. 16, 2014

(65) Prior Publication Data

US 2014/0136465 A1    May 15, 2014

Related U.S. Application Data

(62) Division of application No. 12/822,349, filed on Jun. 24, 2010, now Pat. No. 8,650,146.

(51) Int. Cl.
| | |
|---|---|
| *G06N 5/02* | (2006.01) |
| *G06N 5/04* | (2006.01) |
| *G06F 7/02* | (2006.01) |
| *G06F 17/30* | (2006.01) |

(52) U.S. Cl.
CPC ........ *G06N 5/022* (2013.01); *G06F 7/02* (2013.01); *G06F 17/30985* (2013.01); *G06N 5/047* (2013.01); *G06F 2207/025* (2013.01)

(58) Field of Classification Search
CPC .................................................... G06N 5/047
USPC ................................................................ 706/48
See application file for complete search history.

(56) References Cited

U.S. PATENT DOCUMENTS

| | | | |
|---|---|---|---|
| 2006/0136570 A1 | 6/2006 | Pandya | |
| 2008/0034427 A1 | 2/2008 | Cadambi et al. | |
| 2008/0140631 A1 | 6/2008 | Pandya | |
| 2008/0140661 A1 | 6/2008 | Pandya | |
| 2008/0140662 A1 | 6/2008 | Pandya | |
| 2008/0140991 A1 | 6/2008 | Pandya | |
| 2009/0106183 A1 | 4/2009 | Estan et al. | |

OTHER PUBLICATIONS

Fang Yu, Zhifeng Chen, Yanlei Diao, T.V. Lakshman, Randy H. Katz, "Fast and Memory-Efficient Regular Expression Matching for Deep Packet Inspection," ANCS'06, Dec. 3-5, 2006, San Jose, California, USA.
Derk Pao, "A NFA-Based Programmable Regular Expression Match Engine for Deep Packet Inspection," Electronic Engineering Department, City University of Hong Kong, Hong Kong.
Michela Becchi, Mark Franklin, Patrick Crowley, "A Workload for Evaluating Deep Packet Inspection Architectures," IEEE, 2008, 978-1-4244-2778-9/08.
Domenica Ficara, et al., "An Improved DFA for Fast Regular Express Matching," ACM SIGCOMM Computer Communication Review, vol. 38, No. 5, Oct. 2008.
Tang et al. ("Deflation DFA: Remembering History is Adequate" ICC May 23-27, 2010).
AbuHmed et al. ("A Survey on Deep Packet Inspection for Intrusion Detection Systems" Mar. 2008).
Mitra et al. ("Comiling PCRE to FPGA for Accelerating SNORT IDS" Dec. 2007).

*Primary Examiner* — Lut Wong
(74) *Attorney, Agent, or Firm* — Barnes & Thornburg LLP (57) ABSTRACT

Disclosed is a method and apparatus for matching regular expressions. A buffer of symbols giving a number of the last occurrence positions of each symbol is maintained. When two constants match on either side of a regular expression operator, the buffer of symbols is queried to determine if a member of the complement of the regular expression operator occurred between the two constants. If so, then the operator was not satisfied. If not, then the operator was satisfied.

9 Claims, 5 Drawing Sheets

IMPULSE REGULAR EXPRESSION MATCHING

CROSS-REFERENCE TO RELATED APPLICATION

This application is a divisional application of U.S. patent application Ser. No. 12/822,349, filed Jun. 24, 2010, by Alexander Podkolzin, et al., entitled "Impulse Regular Expression Matching," the entire content of which is specifically incorporated herein by reference for all that it discloses and teaches.

BACKGROUND OF THE INVENTION

Regular expression matching allows patterns of characters, words, text, and/or symbols to be matched with input strings or streams. Typically, a regular expression (a.k.a. regex or regexp) is specified in a formal language that provides a flexible means for expressing the patterns to be matched. An example of a regular expression matching language is specified by the IEEE POSIX Basic Regular Expression standard.

One of the uses of regular expression matching is for Deep Packet Inspection (DPI). In DPI, a packet traversing a network may be searched by a piece of network equipment against a database of regular expressions for protocol non-compliance, viruses, SPAM, intrusions, other predefined criteria, or to collect statistical information. If a search turns up a successful match, further actions may be taken on the packet. DPI may be used by enterprises, service providers and governments for a wide range of applications

SUMMARY OF THE INVENTION

An embodiment of the invention may therefore further comprise a system that matches a string of symbols to a regular expression pattern, the regular expression pattern comprising a first constant, a second constant, and a first operator, the first operator occurring between the first constant and the second constant in the regular expression pattern, comprising: a deterministic finite automaton (DFA) engine that matches the first constant to the regular expression pattern starting at a first position in the string of symbols, the first DFA engine matching the second constant to the regular expression pattern ending at a second position in the string of symbols; a buffer of symbols that associates a plurality of positions of occurrences of a plurality of symbols in the string of symbols, the buffer of symbols producing an indicator that a position of a symbol from a complementary set of symbols is between the first position and the second position, the complementary set of symbols being based on a complement of the first operator, the indicator corresponding to whether the first operator is satisfied.

An embodiment of the present invention may further comprise a method of matching a string of symbols to a regular expression pattern, the regular expression pattern comprising a first constant, a second constant, and a first operator, the first operator occurring between the first constant and the second constant in the regular expression pattern, comprising: using a first deterministic finite automaton (DFA), matching the first constant to the regular expression starting at a first position in the string of symbols and matching the second constant to the regular expression ending at a second position in the string of symbols; and, associating a plurality of positions of occurrences of a plurality of symbols in the string of symbols; and, producing an indicator that a position of a symbol from a complementary set of symbols is between the first position and the second position, the complementary set of symbols being based on a complement of the first operator, the indicator corresponding to whether the first operator is satisfied.

An embodiment of the present invention may further comprise a computer readable medium having instructions stored thereon for matching a string of symbols to a regular expression pattern, the regular expression pattern comprising a first constant, a second constant, and a first operator, the first operator occurring between the first constant and the second constant in the regular expression pattern that, when executed by a computer, at least instruct the computer to: using a first deterministic finite automaton (DFA), match the first constant to the regular expression starting at a first position in the string of symbols and match the second constant to the regular expression ending at a second position in the string of symbols; and, associate a plurality of positions of occurrences of a plurality of symbols in the string of symbols; and, produce an indicator that a position of a symbol from a complementary set of symbols is between the first position and the second position, the complementary set of symbols being based on a complement of the first operator, the indicator corresponding to whether the first operator is satisfied.

DETAILED DESCRIPTION OF THE EMBODIMENTS

Figure 1:
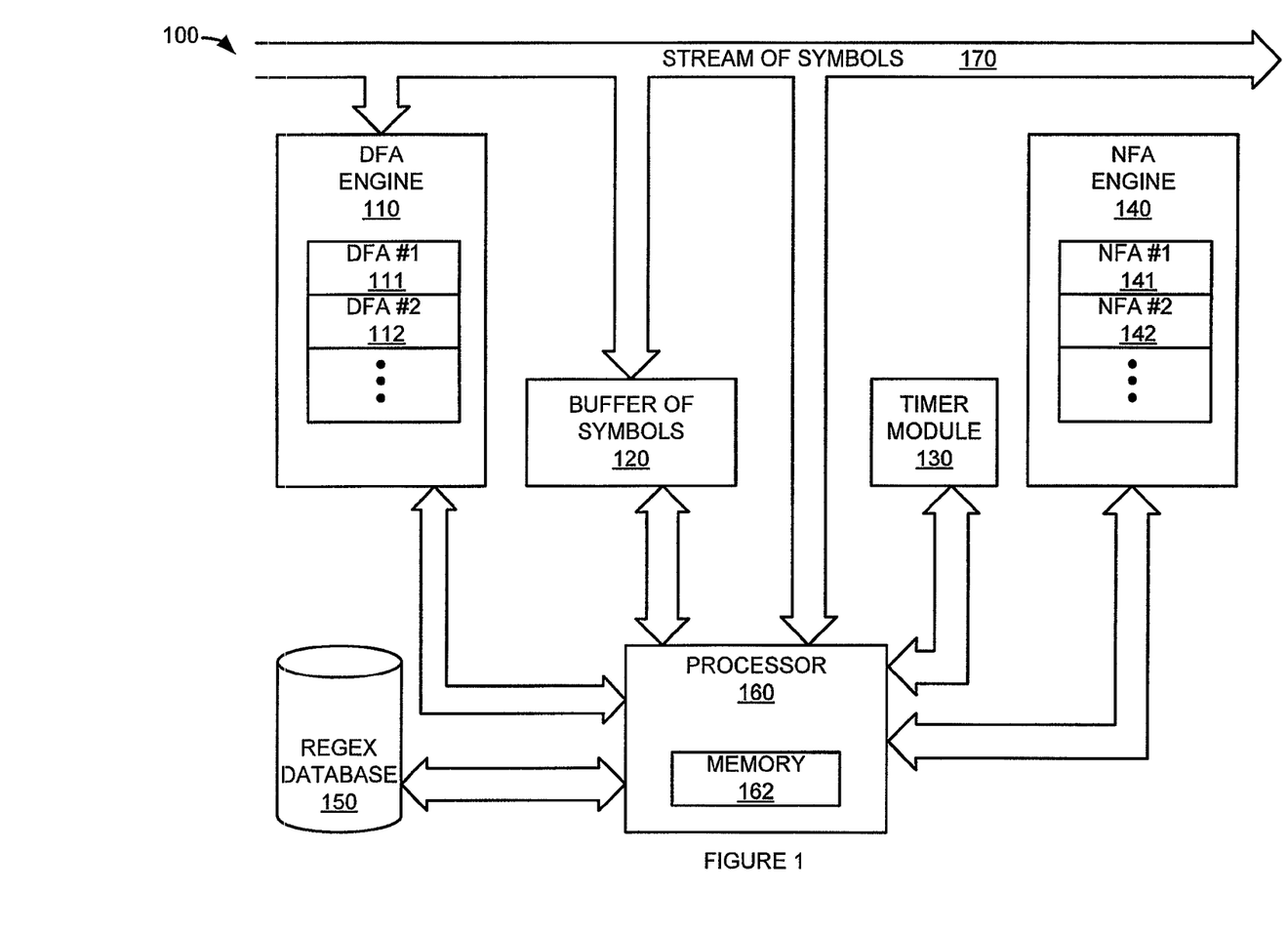
FIG. 1 is a block diagram of a regular expression matching engine.

FIG. 1 is a block diagram of a regular expression matching engine. In FIG. 1, regular expression (regex) matching engine 100 comprises: deterministic finite automaton (DFA) engine 110; buffer of symbols 120; timer module 130; non-deterministic finite automaton (NFA) engine 140; regex database 150; and processor 160. A stream of symbols 170 is operatively coupled to DFA engine 110. DFA engine 110 may include several DFA's 111 and 112. DFA engine 110 may include software, field-programmable gate array (FPGA) hardware, and/or at least one microprocessor core to implement one or more DFA's 111 and 112.

The stream of symbols 170 is also operatively coupled to buffer of symbols 120 and processor 160. DFA engine 110 is operatively coupled to processor 160. Buffer of symbols 120 is operatively coupled to processor 160. Processor 160 is operatively coupled to regex database 150 and timer module 130. Processor 160 may be coupled to NFA engine 140. NFA engine 140 may include several NFA's 141 and 142. NFA 140 may include software, field-programmable gate array hardware, and/or a microprocessor core to implement one or more NFA's 141 and 142. Processor 160 includes memory 162.

In an embodiment, stream of symbols 170 may be, include, or comprise 8-bit ASCII characters. Stream of symbols 170 may be all or part of a network packet comprised of ASCII characters or another encoding. In an embodiment, stream of symbols 170 may be, include, or comprise symbols selected from a symbol set that is larger and/or smaller than 8 bits (e.g., 16 or 32 bits). In an embodiment, stream of symbols 170 comprises network packets traversing a packet network. This packet network may be part of a network or collection of networks that couple, link, or otherwise operatively connect with other devices. This network may include other secondary data networks. In an example, this network may be, comprise, or be coupled to a backhaul network, a local network, a long distance network, another packet network, the internet, or any combination thereof, as well as other types of networks. In an embodiment, stream of symbols 170 may be received from, or traverse, a local bus such as a Universal Serial Bus, Serial ATA, or other local hardware connection used to interconnect devices in the same chassis, PC board, or room.

In an embodiment, regex engine 100 processes regular expressions in regex database 150. These regular expressions are separated into a sequence of alternating "word components" (or constants) and "pauses" (or operators). This sequence may be represented as B[1], A[1], B[2], A[2], ... A[n], B[n+1]; where: A[i] are the constant components and B[i] are the operator components. Constant components typically consist of simple symbolic groups such a word (e.g., "root\n") or small letter pairs (e.g., [aA]). Operators typically consist of complex symbolic groups that may require iterations (e.g., a\{3,5\}). An example of this separation is given in Table 1, below.

TABLE 1

Input regex: "^query=[^&]*union"

| Component | Value |
|---|---|
| B[1]: | empty (e.g., NULL string) |
| A[1]: | "\nquery=" |
| B[2]: | "[^&]*" |
| A[2]: | "union" |
| B[3]: | empty |

In an embodiment, the constants are matched by DFA engine 110. Each constant from regex database 150 may be compiled into one or more DFA's 111 and 112. Operators are matched with the aid of buffer of symbols 120. In an embodiment, regex database 150 is compiled into only a single DFA 111.

Buffer of symbols 120 may comprise a queue for each possible symbol in symbol stream 170. For example, for the 8-bit ASCII character set, buffer of symbols 120 would have 256 queues—one for each symbol. Each individual queue indicates the last N positions when that symbol appeared, where N is the number of entries in each individual queue. In an embodiment, N is less than 30 entries per queue. In an embodiment, N may be different for different symbol queues.

For example, take the stream of symbols 170 given in Table 2 where t is equal to the symbols distance from the current symbol being processed (t=11).

TABLE 2

| t = | 1 | 2 | 3 | 4 | 5 | 6 | 7 | 8 | 9 | 10 |
|---|---|---|---|---|---|---|---|---|---|---|
| symbol | a | b | b | a | c | c | c | a | b | c |

In this case, the queue corresponding to the symbol "a" would indicate the symbol positions: 1, 4, and 8; the symbol "b" queue would indicate the positions 2, 3, and 9; and, the symbol "c" queue would indicate the positions 5, 6, 7, and 10.

When queried by processor 160, buffer of symbols 120 may receive two pieces of input data represents as {S,t}. S is a mask representing a set of symbols. For example, for the ASCII character set, S would be 256 bits in length (one bit for each symbol in the symbol set). The second piece of data, t, corresponds to a symbol position in the past relative to the symbol being processed (i.e., a distance to the right of the current symbol when the symbols are arranged in a reading order of left to right).

In response to the query, buffer of symbols 120 may return the symbol position between the first symbol position and t that is the closest symbol position to position t with a symbol that is a member of the set of symbols represented by S. This result is designated as t'. To illustrate, consider an example using the symbol stream in Table 2 and where S consists of the symbols "a" and "b" and buffer of symbols is queried with a t=7 (e.g., S={a,b} and t=7). Buffer of symbols 120 would return symbol position t'=4. (e.g., the "b" at t=3 is the closest of the "b" position entries and the "a" position at t=4 that are less than 7 (i.e., between t=1 and t=7).

To illustrate how the results received from buffer of symbols 120 are used, consider the example regex given in Table 1 and a string that matches that regex (e.g., the string "\nquery=REunion"). When regex engine 100 has first matched A[1]="\nquery=", and then subsequently matches A[2]="union", it proceeds to query buffer of symbols 120 to attempt to match B[2]="[^&]*". To do this, regex engine 100 uses the information that A[1] matched between positions t=1 and t=7. Regex engine 100 also knows that A[2] matched between positions t=10 and t=14. Therefore, regex engine 100 may determine that B[1] possibly begins at t=8 and ends at t=9. Processor 160 may then query buffer of symbols 120 with the complement of the set defined by B[2], S={&} and t=9. If the value returned by buffer of symbols 120 is in the range of B[1], then the condition is violated and there is not a match of B[1]. In this example, since t=8 was an "R" and t=9 was an "E", then buffer of symbols would return a t' that was not in the range of B[1] and thus the condition was violated. If, for a different string (e.g., "\nquery=&Bunion") the value returned by buffer of symbols 120 is in the range of B[1], then the condition is matched. This process of finding the beginning and end of an operator by matching constants on either side of the operator, and then determining if the operator was satisfied by querying the buffer of symbols 120 to determine if a member of the complement set to the operator was present in the range of the operator (i.e., between the symbols) will be referred to as "backward matching."

In an embodiment, a process of matching an entire string (or stream of symbols) to a particular regex database 150 may be summarized as follows:

TABLE 3

1) Separate each regex (R) from regex database 150 into constants A[1] ... A[n] and operators B[1] ... B[n + 1].
2) When a DFA matches a "starting" constant (e.g., A[1]) and indicator of all of those regex's that start with that constant to a queue. Each of these regex's are then processed to see if their A[2] matches.
  In an embodiment, the matching of A[2] may be performed by the same DFA (e.g., DFA #1 111) that matched the starting constant A[1]. In another embodiment, DFA's may work independently and in parallel. In this case, the matching of A[2] may be acomplised by a second DFA (e.g., DFA #2 112). If yes, the second constant is matched, then backward matching is used to see if the B[1] for that regex matches. If yes, the operator between the first two constants is matched, then the regex is placed in a queue to determine if A[3] matches, and so on. The queues may be managed through the use of mailbox structures or the like that pass information about the beginning and end of the constants that have matched in order to determine the beginning and end of each B[i]. In particular, when DFA engine 110 matches a constant A[1], it may pass this information into a mailbox structure associated with A[2]. When DFA engine matches constant A[2], the information in the mailbox is extracted to trigger and provide the information necessary for the backward matching of B[1].

In an embodiment, timer module 130 stores positions in input strings where (are when, in symbols times) backward matching should start. When the matching process reaches a position specified by a backward matching of a "pause" starts (e.g., B[i] which is associated with this position by timer module 130). In an embodiment, timer module 130 is used when A[i+1] is not present but a lower bound for the length of a substring matched by B[i] is known.

In an embodiment, NFA engine 140 is programmable hardware for matching regular expressions of a selected special type. In particular, the selected type may be those regular expression that are of "linear" form. This linear form is characterized by A[1] . . . A[n], where every A[i] is a character class (set of symbols) or its iteration. NFA engine 140 may be implemented as one-dimensional cellular automaton. Processor 160 can select in this array a "free" segment and program it for matching a selected regular expression (referred to in this discussion as R). If a segment matches regex R, a signal may be sent to a queue module. The matching process is continued, until there exists possibility of a future matching or until a special "stop condition" (as defined by processor 160 while programming NFA engine 140) becomes true.

It should be noted that regex engine 100, and the methods described later, have several good properties. In this system (referred to as impulse regular expression matching), regex matching is free from exponential memory growth. If there is a database of regular expressions (e.g., regex database 150) that is searched for, and a new expression is added into this database, the amount of memory required by a solely DFA-based solutions may grow exponentially (from n bytes to $2^n$ bytes). Regex engine 100 does not require exponential growth. Regex engine 100 also supports "incremental compilation". A new expression may be added efficiently to regex database 150, and searched for by regex engine 100 efficiently. In a contrast to classical DFA-based approach, the time required for adding a new expression depends linearly on the size of the database and expression. Finally, regex engine 100 can match regular expressions with additional constraints, such as a regex that specifies the minimal length of substring of input string of symbols matched by a regex (e.g., the so-called Min-Len problem).

Figure 2:
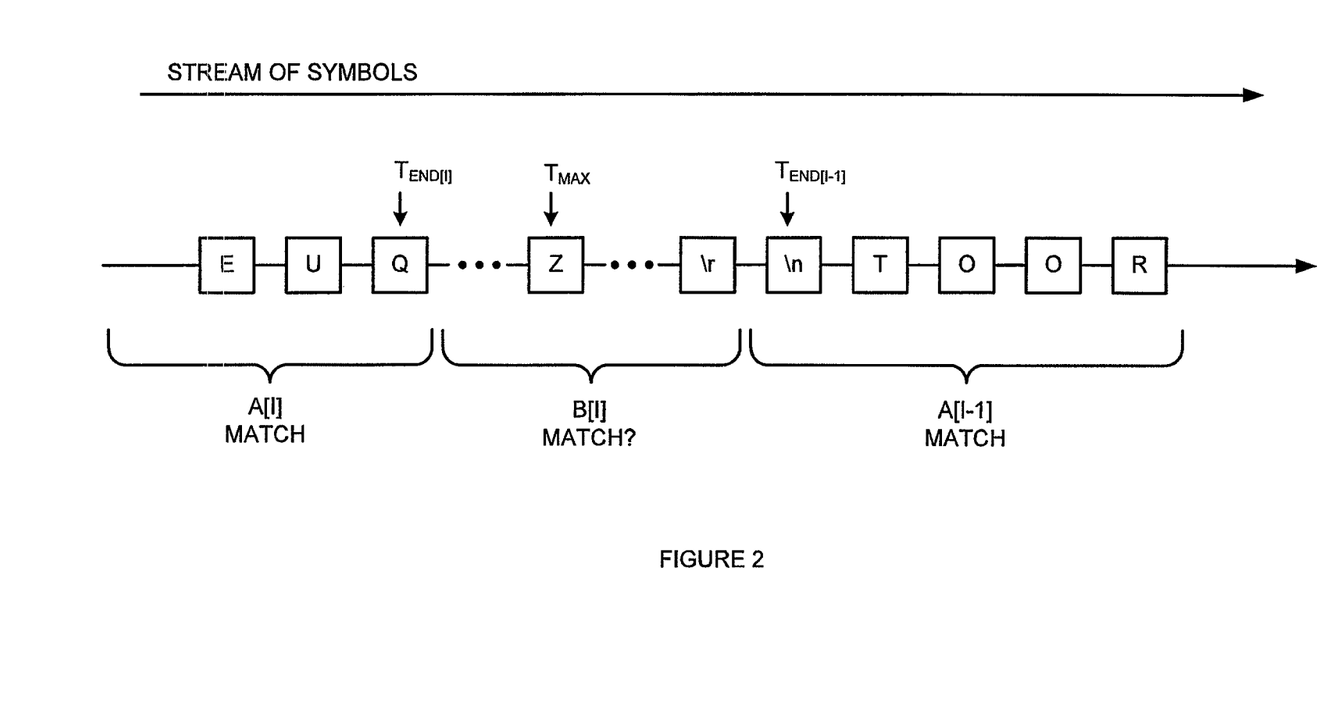
FIG. 2 is an illustration of backward matching of regular expression operators on a stream of symbols.

FIG. 2 is an illustration of backward matching of regular expression operators on a stream of symbols. In FIG. 2, the symbols are arriving in time from right to left (i.e., the symbol "R" arrived in regex engine 100 first, the symbol "E" arrived last). Regex engine 100 first matches the constant A[i]="root\n". This allows regex engine 100 to determine $T_{END[i-1]}$—the ending position (or time as measured by symbols) of A[i-1]. Likewise, the beginning of B[i] may be determines as $T_{END[i-1]}+1$. When regex engine 100 matches the constant A[i]="QUE", regex engine 100 is able determine $T_{END[i]}$—the ending position (or time as measured by symbols) of A[i]. Likewise, the end of B[i] may be determines as $T_{END[i]}-1$. Thus, regex engine 100 may query buffer of symbols 120 to determine $T_{MAX}$—the most recent position after $T_{END[i-1]}+1$ that holds a member of the set consisting of the complement of the symbols in B[i]. If $T_{MAX}$ is in the range between (but not including) $T_{END[i-1]}+1$ and $T_{END[i]}-1$, then B[i] is not satisfied. If $T_{MAX}$ is not in the range between (but not including) $T_{END[i-1]}+1$ and $T_{END[i]}-1$, then B[i] is satisfied.

Figure 3:
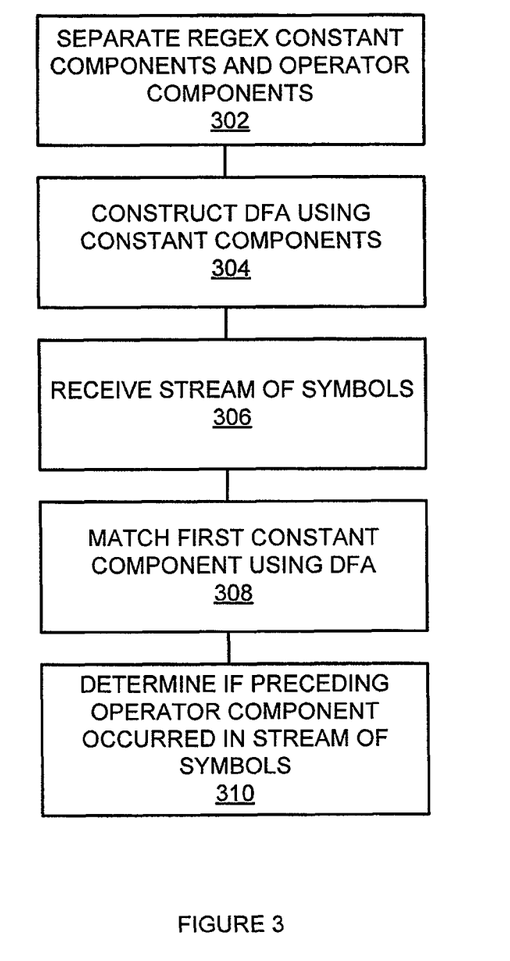
FIG. 3 is a flowchart of a method of regular expression matching.

FIG. 3 is a flowchart of a method of regular expression matching. The steps illustrated in FIG. 3 may be performed by one or more elements of regex engine 100. The constant components and the operator components of a regex are separated (302). For example, processor 160 may separate one or more regexs from regex database 150 into constant components ("word components") and operator components ("pauses"). The constant component may be represented by A[i] and the operator components may be represented by B[i] as shown in FIG. 2.

A DFA is constructed using the constant components (304). For example, processor 160 may construct and configure programmable hardware (e.g., an FPGA) in DFA engine 110 into a DFA (e.g., DFA #1 111) that matches a constant component separated in block 302. In another example, processor 160 may construct a DFA tree (or other data structure) and store it in memory 160. This DFA may be a DFA that matches a constant components A[i] or A[i-1] as shown in FIG. 2.

A stream of symbols is received (306). For example, regex engine 100 may receive stream of symbols 170 in the form of a packet from a network. Regex engine 100 may distribute the symbols received to various components including, but not limited to, DFA engine 110, buffer of symbols 120, NFA engine 140, and/or processor 160.

A first constant component is matched using DFA (308). For example, regex engine 100 may match a constant component separated in block 302 using DFA 111. In another example, processor 160 may match a constant using a DFA tree stored in memory 160. This constant component may be the constant A[i-1] as shown in FIG. 2.

It is determined if a preceding operator component occurred in the stream of symbols (310). For example, regex engine 100 may use buffer of symbols 120 to determine a $T_{MAX}$ and then determine whether $T_{MAX}$ is between $T_{END[i-1]}+1$ and $T_{END[i]}-1$. If it is, then the operator B[i] is not satisfied. If it is not, the B[i] is satisfied. In another example, regex engine 100 may use NFA engine 140 to determine if the operator component immediately preceding the constant component matched in block 308 is satisfied. Either of these examples may be matched (or not matched as the case may be) under the control of processor 160.

Figure 4:
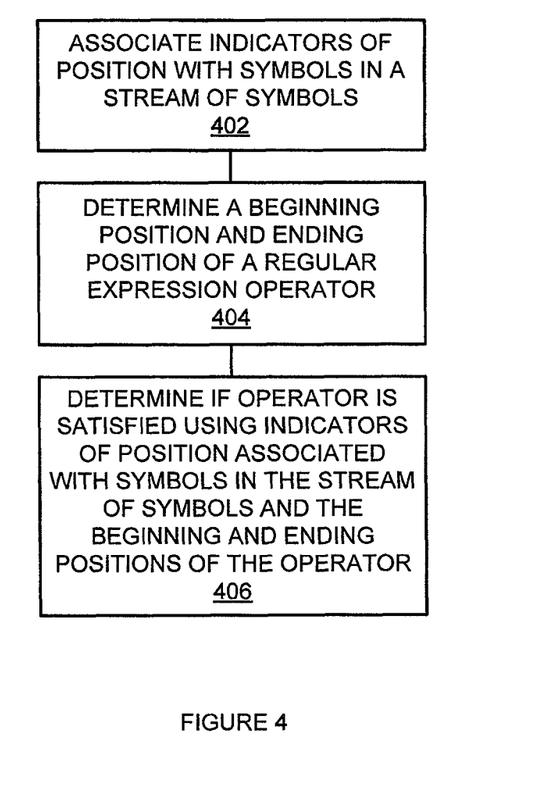
FIG. 4 is a flowchart of a method of backward matching a regular expression operator.

FIG. 4 is a flowchart of a method of backward matching a regular expression operator. The steps illustrated in FIG. 3 may be performed by one or more elements of regex engine 100. Indicators of position are associated with symbols in a stream of symbols (402). For example, buffer of symbols 120 may maintain queues for each possible symbol in symbol stream 170. Each individual queue may contain indicators of the last N positions when that symbol appeared, where N is the number of entries in each individual queue.

A beginning position and an ending position of a regular expression operator are determined (404). For example, the beginning and ending position of the operator B[i] shown in FIG. 2 may be determined by processor 160. Processor 160 may cooperate with DFA engine 110 in order to determine the beginning and ending positions based on the matching of the constant components A[i] and A[i-1].

It is determined if the operator is satisfied using indicators of position associated with symbols in the stream of symbols and the beginning and ending positions of the operator (406). For example, processor 160 may determine if operator B[i] is satisfied based on the indicators associated in block 402 and the beginning and ending positions determined in block 404. Processor 160 may receive an indicator of symbol position from buffer of symbols 120. This indicator may be received in response to a query of buffer of symbols 120. The query of buffer of symbols 120 may include a time and a complement set of symbols. Buffer of symbols may return the latest time before the time that a member of the complement set of symbols (e.g., complement of the operator set of symbols) occurred in stream of symbols 170.

The systems, engines, databases, processors, modules, and functions described above may be implemented with or executed by one or more computer systems. The methods described above may also be stored on a computer readable medium. Many of the elements of regex engine 100 may be, comprise, or include computers systems. This includes, but is not limited to, DFA engine 110, buffer of symbols 120 timer module 130, NFA engine 140, regex database 150, and processor 160.

Figure 5:
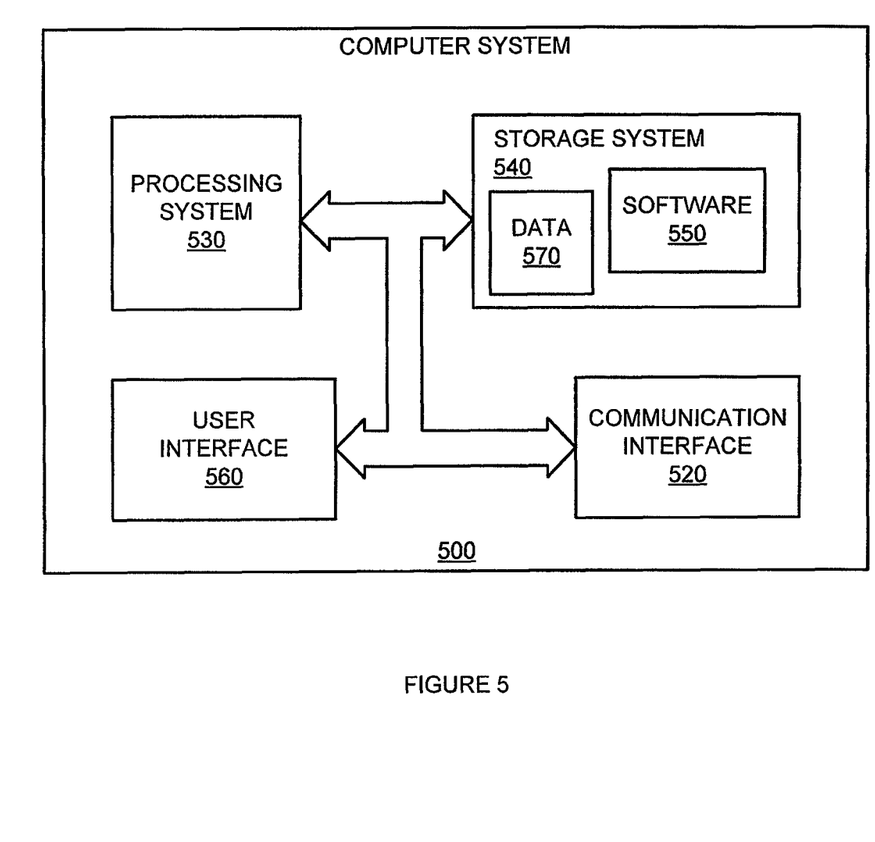
FIG. 5 is a block diagram of a computer system.

FIG. 5 illustrates a block diagram of a computer system. Computer system 500 includes communication interface 520, processing system 530, storage system 540, and user interface 560. Processing system 530 is operatively coupled to storage system 540. Storage system 540 stores software 550 and data 570. Processing system 530 is operatively coupled to communication interface 520 and user interface 560. Computer system 500 may comprise a programmed general-purpose computer. Computer system 500 may include a microprocessor. Computer system 500 may comprise programmable or special purpose circuitry. Computer system 500 may be distributed among multiple devices, processors, storage, and/or interfaces that together comprise elements 520-570.

Communication interface 520 may comprise a network interface, modem, port, bus, link, transceiver, or other communication device. Communication interface 520 may be distributed among multiple communication devices. Processing system 530 may comprise a microprocessor, microcontroller, logic circuit, or other processing device. Processing system 530 may be distributed among multiple processing devices. User interface 560 may comprise a keyboard, mouse, voice recognition interface, microphone and speakers, graphical display, touch screen, or other type of user interface device. User interface 560 may be distributed among multiple interface devices. Storage system 540 may comprise a disk, tape, integrated circuit, RAM, ROM, network storage, server, or other memory function. Storage system 540 may be a computer readable medium. Storage system 540 may be distributed among multiple memory devices.

Processing system 530 retrieves and executes software 550 from storage system 540. Processing system may retrieve and store data 570. Processing system may also retrieve and store data via communication interface 520. Processing system 550 may create or modify software 550 or data 570 to achieve a tangible result. Processing system may control communication interface 520 or user interface 570 to achieve a tangible result. Processing system may retrieve and execute remotely stored software via communication interface 520.

Software 550 and remotely stored software may comprise an operating system, utilities, drivers, networking software, and other software typically executed by a computer system. Software 550 may comprise an application program, applet, firmware, or other form of machine-readable processing instructions typically executed by a computer system. When executed by processing system 530, software 550 or remotely stored software may direct computer system 500 to operate as described herein.

The foregoing description of the invention has been presented for purposes of illustration and description. It is not intended to be exhaustive or to limit the invention to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. A system that matches a string of symbols to a regular expression pattern, said regular expression pattern comprising a first constant, a second constant, and a first operator, said first operator occurring between said first constant and said second constant in said regular expression pattern, comprising:
    a processor;
    a memory;
    a deterministic finite automaton (DFA) engine that matches said first constant to said regular expression pattern starting at a first position in said string of symbols, the first DFA engine matching said second constant to said regular expression pattern ending at a second position in said string of symbols; and
    a buffer of symbols that associates a plurality of positions of occurrences of a plurality of symbols in said string of symbols, said buffer of symbols producing an indicator that a position of a symbol from a complementary set of symbols is between said first position and said second position, said complementary set of symbols being based on a complement of said first operator, said indicator corresponding to whether the first operator is satisfied.

2. The system of claim 1, wherein said buffer of symbols selects an occurrence position from said plurality of positions of occurrences based on associations to said complementary set of symbols.

3. The system of claim 1, further comprising:
    a plurality of that match a plurality of constants to said regular expression pattern at a plurality of starting positions and a plurality of ending positions in said string of symbols, said plurality of starting positions and said plurality of ending positions defining a plurality of ranges of positions that are compared with at least one of said positions of occurrences to determine if at least one of a plurality of operators occurring between two of said plurality of constants is not satisfied.

4. A method of matching a string of symbols to a regular expression pattern, said regular expression pattern comprising a first constant, a second constant, and a first operator, said first operator occurring between said first constant and said second constant in said regular expression pattern, comprising:
    using a first deterministic finite automaton (DFA), matching said first constant to said regular expression starting at a first position in said string of symbols and matching said second constant to said regular expression ending at a second position in said string of symbols; and,
    associating a plurality of positions of occurrences of a plurality of symbols in said string of symbols;
    producing an indicator that a position of a symbol from a complementary set of symbols is between said first position and said second position, said complementary set of symbols being based on a complement of said first operator, said indicator corresponding to whether the first operator is satisfied.

5. The method of claim 4, further comprising:
    selecting an occurrence position from said plurality of positions of occurrences based on associations to said complementary set of symbols.

6. The method of claim 4, further comprising:
    matching a plurality of constants to said regular expression pattern at a plurality of starting positions and a plurality of ending positions in said string of symbols, said plurality of starting positions and said plurality of ending positions defining a plurality of ranges of positions that are compared with at least one of said positions of occurrences to determine if at least one of a plurality of operators occurring between two of said plurality of constants is not satisfied.

7. One or more non-transitory, computer readable medium having instructions stored thereon for matching a string of symbols to a regular expression pattern, said regular expression pattern comprising a first constant, a second constant, and a first operator, said first operator occurring between said first constant and said second constant in said regular expression pattern that, when executed by a computer, at least instruct the computer to:
  using a first deterministic finite automaton (DFA), match said first constant to said regular expression starting at a first position in said string of symbols and match said second constant to said regular expression ending at a second position in said string of symbols; and,
  associate a plurality of positions of occurrences of a plurality of symbols in said string of symbols; and,
  produce an indicator that a position of a symbol from a complementary set of symbols is between said first position and said second position, said complementary set of symbols being based on a complement of said first operator, said indicator corresponding to whether the first operator is satisfied.

8. The one or more non-transitory, computer readable medium of claim 7, wherein the computer is further instructed to:
  select an occurrence position from said plurality of positions of occurrences based on associations to said complementary set of symbols.

9. The one or more non-transitory, computer readable medium of claim 7, wherein the computer is further instructed to:
  match a plurality of constants to said regular expression pattern at a plurality of starting positions and a plurality of ending positions in said string of symbols, said plurality of starting positions and said plurality of ending positions defining a plurality of ranges of positions that are compared with at least one of said positions of occurrences to determine if at least one of a plurality of operators occurring between two of said plurality of constants is not satisfied.

* * * * *